United States Patent [19]

Ogasawara et al.

[11] Patent Number: 5,117,320

[45] Date of Patent: May 26, 1992

[54] MAGNETOSTRICTIVE HEAD WITH D.C. BIAS MAGNETIC FIELD

[75] Inventors: Kenji Ogasawara, Machida; Koji Kurachi, Yokohama; Atsushi Tobari, Fujisawa, all of Japan

[73] Assignee: International Business Machines Corporation, Armonk, N.Y.

[21] Appl. No.: 592,431

[22] Filed: Oct. 4, 1990

[30] Foreign Application Priority Data

Oct. 5, 1989 [JP] Japan .................. 1-258970

[51] Int. Cl.⁵ .................. G11B 5/127; G11B 5/33
[52] U.S. Cl. .................. 360/113; 360/66
[58] Field of Search .................. 360/66, 113

Primary Examiner—Aristotelis Psitos
Assistant Examiner—Michael J. Brock
Attorney, Agent, or Firm—Otto Schmid, Jr.

[57] ABSTRACT

A magnetic head device comprising a magnetic core member made from a magnetic material having a positive magnetostriction constant and having confronting pole pieces separated by a non-magnetic material to form a transducing gap. A coil is wound around the magnetic core member so that a read signal can be read out from the coil, and a d.c. bias magnetic field is generated in the magnetic core member when a read signal is read out from the coil so that distortion of the read signal is suppressed.

3 Claims, 2 Drawing Sheets

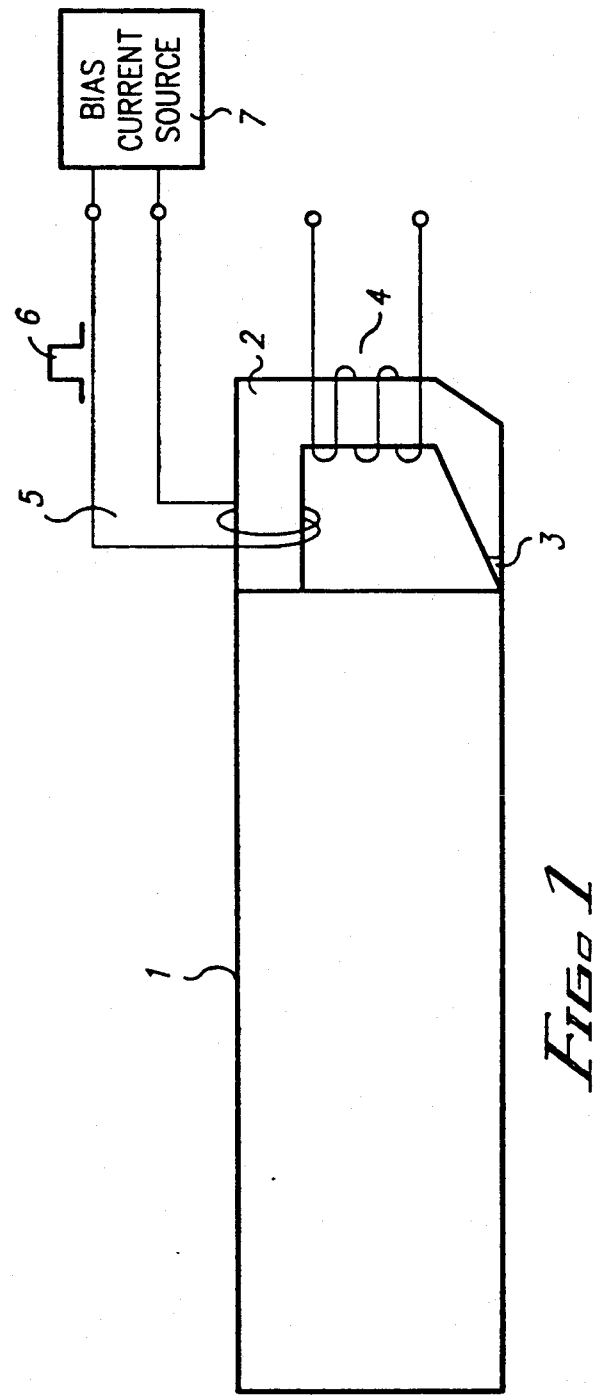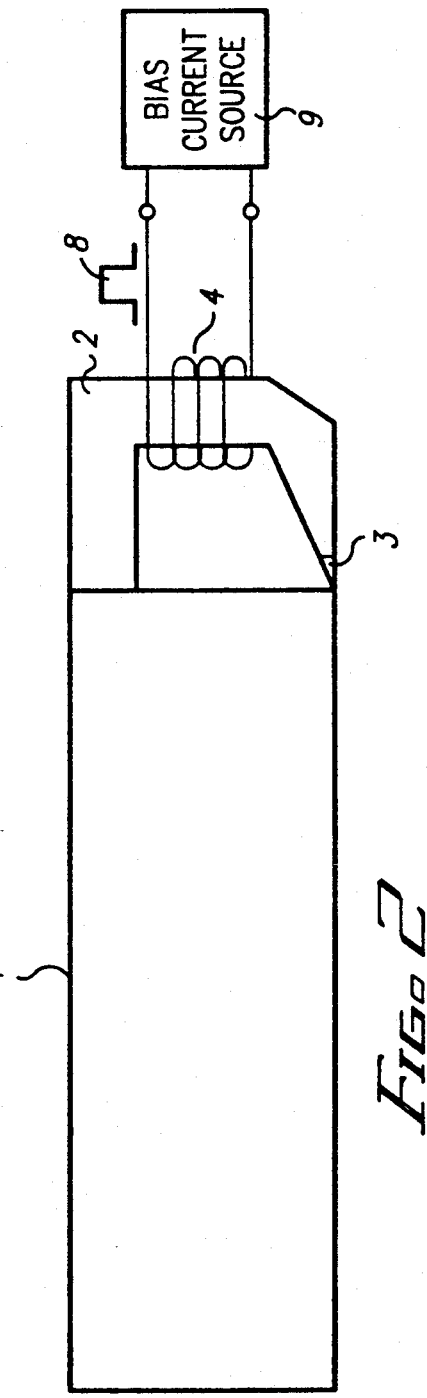

MAGNETOSTRICTIVE HEAD WITH D.C. BIAS MAGNETIC FIELD

BACKGROUND OF THE INVENTION

1. Field of the Invention

The present invention relates to a magnetic head device for use with a magnetic storage medium such as a hard magnetic disk, for example.

2. Description of the Prior Art

In recent years, the volume of data handled by data processing equipment such as computers has progressively increased. Accordingly, there is a strong demand for high-density recording on magnetic disks which are generally used as one of the devices for storing data in data processing systems.

It is generally known that, in high-density magnetic disk recording devices, the read signal which is read out from the recording medium may produce a peak-shift due to distortion caused by the signal processing circuits and a further distortion caused by interference between adjacent pulses on the recording medium. The existence of the peak-shift in the readback signal necessitates a wider sensing window to reliably read the recorded data, and this adversely impacts the recording density that can be reliably achieved.

Various techniques have been proposed for eliminating the distortion caused by the signal processing circuits and the further distortion caused by the interference between adjacent pulses on the recording medium, which have been considered to be the sources of the peak-shift.

Even with these prior art techniques, however, the distortion of the read signal still occurs, and this distortion of the read signal is a significant obstacle to the continued improvement in recording density in magnetic disk recording systems.

SUMMARY OF THE INVENTION

It is therefore the principal object of this invention to provide a magnetic head device which suppresses the distortion of the read signal in a magnetic disk storage system which enables a much greater recording density to be achieved.

In accordance with the invention, the magnetic head device comprises a magnetic core member having a substantially closed path with confronting pole pieces separated by a non-magnetic material to form a transducing gap. The magnetic core member is made from a magnetic material having a positive magnetostriction constant. A coil member is wound around a part of the magnetic core member so that a read signal can be read out from the coil member in response to magnetic fields at or near the transducing gap and a d.c. bias magnetic field is generated in the magnetic core member when a read signal is read out from the coil member so that distortion of the read signal is suppressed.

BRIEF DESCRIPTION OF THE DRAWINGS

FIG. 1 is an illustration showing a schematic view of the magnetic head device according to one embodiment of the present invention.

FIG. 2 is an illustration showing a schematic view of the magnetic head device according to another embodiment of the present invention.

DESCRIPTION OF THE PREFERRED EMBODIMENTS

Figure 3:
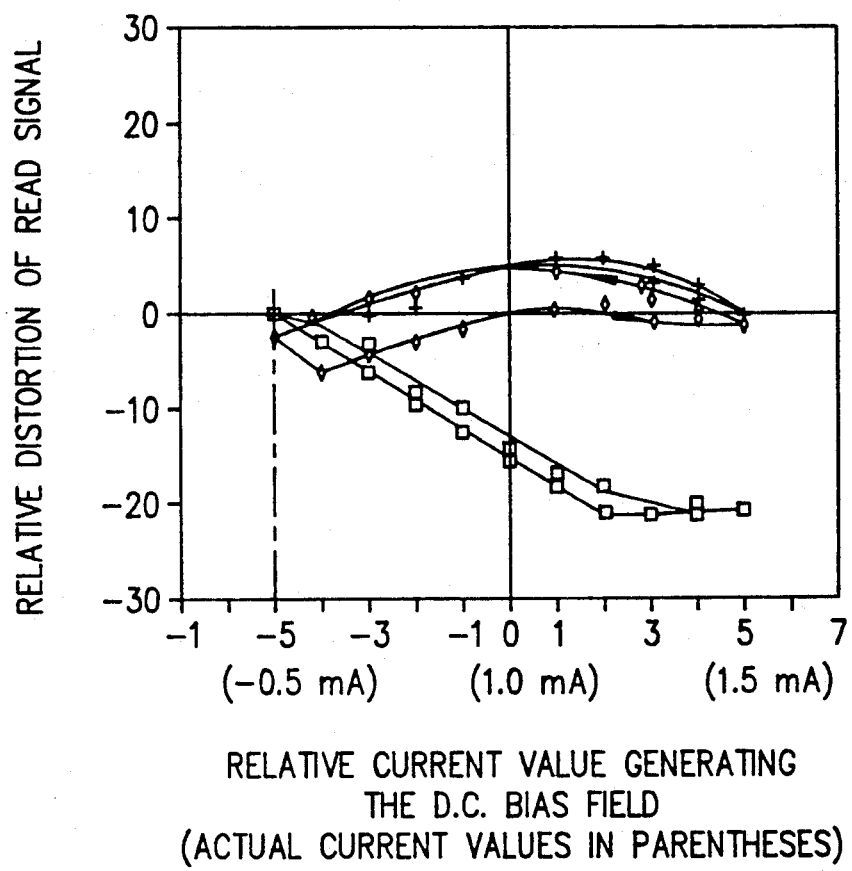
FIG. 3 is a graph showing a plot of relative distortion of the read signal vs d.c. bias field for magnetic heads having different degrees of read signal distortion.

It has been found that the cause of READ signal distortion is also due to the magnetic head device. Due to the difference between the thermal expansion coefficients of the non-magnetic material such as glass constituting the gap portion and the magnetic material of the magnetic elements, such as ferrite, sandwiching the gap portion from both sides, a tensile stress is produced in the gap portion. This tensile stress causes a reverse magnetostriction effect in the magnetic elements, including strong anisotropy in the neighborhood of the gap portion of the magnetic elements. This anisotropy generates the distortion of the READ signal.

If a d.c. bias magnetic field is generated in the magnetic elements in accordance with the present invention, a magnetostriction effect is produced between the magnetic elements sandwiching the gap portion from both sides, so that the gap portion is compressed. The magnitude of this compression in the gap portion can be chosen to cancel the tensile stress caused in the gap portion as described above. Accordingly, no reverse magnetostriction effect is produced in the magnetic elements and also no anisotropy is induced, so that the distortion of the READ signal is suppressed.

In the specific embodiment of the magnetic head device shown in FIG. 1, a gap portion 3 of a very small width consisting of a non-magnetic substance such as glass is formed between magnetic elements 1 and 2. Magnetic elements 1 and 2 form a magnetic core member having a substantially closed path having pole pieces separated by the transducing gap portion 3. Magnetic elements 1 and 2 are made from a magnetic material having a positive magnetostriction constant, such as ferrite material, for example. A read/write coil 4 for producing a READ signal and for introducing a WRITE signal is wound around magnetic element 2. In addition a second coil 5 is wound around magnetic element 2 to produce a d.c. bias field in the magnetic elements 1 and 2.

When a READ signal is being read out from the read/write coil 4, a d.c. magnetic bias field is generated in magnetic elements 1 and 2. The d.c. magnetic bias field is produced by a d.c. current pulse 6 which is coupled from Bias Current Source 7 to bias magnetic field coil 5 only during a READ cycle. The value of the d.c. current pulse is chosen to produce the desired bias magnetic field as will be described in greater detail, and, in a particular embodiment, the d.c. current chosen was 0.5 mA when the value of the a.c. current of the READ signal which is read out from the read/write coil 4 was 40 to 60 mA.

A d.c. bias magnetic field is produced in magnetic elements 1 and 2 as described above, and this field produces a magnetostriction effect between the magnetic elements 1 and 2 which sandwich the gap portion 3 from both sides. This magnetorestriction effect causes the gap portion 3 to be compressed, so that the tensile stress due to the difference in the thermal expansion coefficients of the gap portion 3 material and the magnetic elements 1 and 2 is cancelled. Therefore, no reverse magnetostriction effect is generated in the magnetic elements 1 and 2, no anisotropy is induced, and as a result the distortion of the READ signal is suppressed.

The result of this change is that the error rate improves by one or two orders of magnitude as compared with prior art techniques, so that the recording density can be significantly improved.

An alternate embodiment of the invention is shown in FIG. 2. In this embodiment, the magnetic head device is similar to that shown in FIG. 1, and it comprises a gap portion 3 provided between magnetic elements 1 and 2 and a read/write coil 4 wound around one magnetic element 2. However, in this embodiment there is no separate bias magnetic field coil. Instead, during a READ cycle a d.c. bias magnetic file is generated by a d.c. current pulse 8 which is coupled from Bias Current Source 9 to read/write coil 4 only during a READ cycle. The value of the d.c. current made to flow in read/write coil 4 is similar to the embodiment previously described with reference to FIG. 1.

In this case, a similar effect is produced to that previously described with the result that a much greater recording density can be achieved. This embodiment has the advantage that, without effecting a design modification to the conventional magnetic head device, the present invention can be implemented by a simple modification to the control circuits.

FIG. 3 is a graph which show the effect of applying the present invention to magnetic head devices producing different degrees of READ signal distortion. In this graph the curve defined by plus signs shows experimental results using a magnetic head device in which the distortion due to interference between adjacent pulses on the recording medium is relatively small when there is no d.c. bias magnetic field, the curve defined by the squares shows experimental results using a magnetic head device in which this distortion is large when there is no d.c. bias magnetic field, and the curve defined by the diamonds shows experimental results using a magnetic head device in which there is no distortion when there is no d.c. bias magnetic file.

By reference to FIG. 3, it can be seen that, when the current value generating the d.c. bias magnetic field is about −0.5 mA, the distortion of the READ signal for all the magnetic head devices is approximately 0. This means that, for this particular embodiment, a choice of −0.5 mA for the current value would produce a d.c bias magnetic file which would result in no READ signal distortion without regard to where in the range of characteristics that are considered acceptable to the individual magnetic head devices happen to be. In addition, since the current value generating that d.c bias magnetic field is less than 1 mA, there is no possibility of this magnetic field producing any adverse effect on previously recorded data. In addition, it was experimentally determined that the polarity of the current generating the d.c bias magnetic field may be either positive or negative.

It has been shown, in accordance with the present invention, that a d.c bias magnetic field generated in the magnetic elements when a READ signal is read out, with the result that the compression against the gap portion acts to cancel the tensile stress produced in the gap portion. Because of this no reverse magnetostriction effect and anisotropy occur in the magnetic element so that the distortion of the the READ signal is suppressed and a high recording density is achieved.

We claim:

1. A magnetic head device comprising:
   a magnetic core member having a substantially closed path having pole pieces separated by a non-magnetic material to form a transducing gap, said magnetic core member comprising a magnetic material having a positive magnetostriction constant;
   a coil member wound around a part of said magnetic core member so that a read signal can be read out from said coil member in response to magnetic fields at or near said transducing gap; and
   means for generating a d.c. bias magnetic field in said magnetic core member when a read signal is read out from said coil member.

2. The magnetic head device of claim 1 additionally comprising:
   a bias current source for generating a d.c. current of a predetermined value; and
   means for coupling said bias current source to said coil member to produce said d.c. bias magnetic field in said magnetic core member.

3. The magnetic head device of claim 1 additionally comprising:
   a bias current source for generating a d.c. current of a predetermined level;
   a second coil would around a part of said magnetic core member; and
   means for coupling said bias current source to said second coil to produce said d.c. bias magnetic field in said magnetic core member.

* * * * *